Sept. 6, 1960 W. P. KIRBY ET AL Re. 24,866
TELESCOPING DIPOLE ANTENNA
Original Filed Aug. 12, 1957
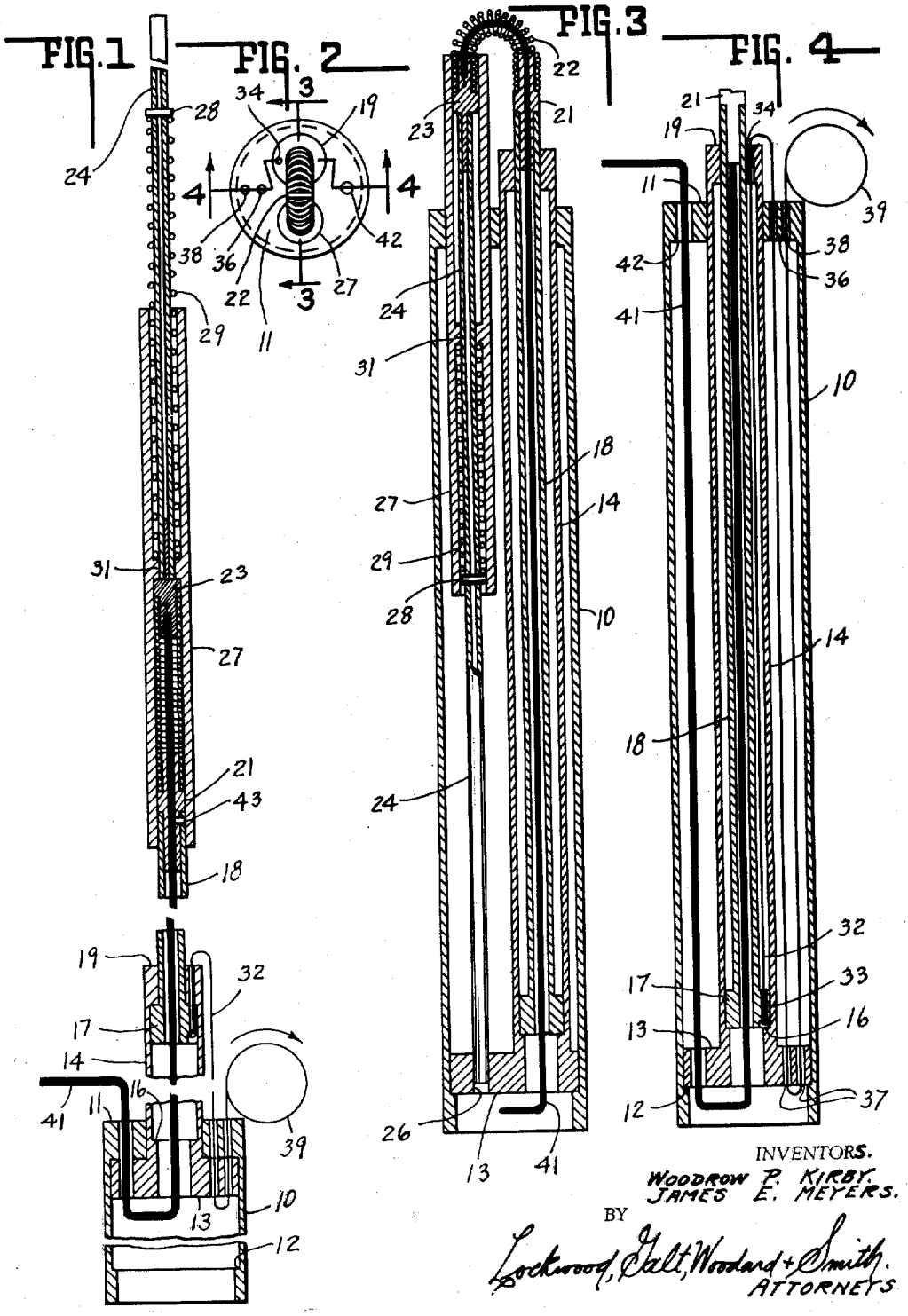
INVENTORS.
WOODROW P. KIRBY.
JAMES E. MEYERS.
BY
Lockwood, Galt, Woodard + Smith.
ATTORNEYS United States Patent Office Re. 24,866
Reissued Sept. 6, 1960

24,866

TELESCOPING DIPOLE ANTENNA

Woodrow P. Kirby, Hicksville, Ohio, and James E. Meyers, Fort Wayne, Ind., assignors to The Magnavox Company, Fort Wayne, Ind., a corporation Original No. 2,866,198, dated Dec. 23, 1958, Ser. No. 677,603, Aug. 12, 1957. Application for reissue Oct. 5, 1959, Ser. No. 845,056

18 Claims. (Cl. 343—901)

Matter enclosed in heavy brackets [ ] appears in the original patent but forms no part of this reissue specification; matter printed in italics indicates the additions made by reissue.

This invention relates generally to extensible antennas for communication equipment and in particular to telescoping extensible dipole antennas.

For use with communication equipment, particularly that of the mobile type, it has become conventional to provide antennas capable of being stored in, or folded into, a housing having a length which is considerably smaller than the extended length of the antenna. Obvious difficulties are encountered in providing antennas of this type which utilize articulated, or folded, sections and which may be power actuated into extended position. The required relatively small dimension of the storage housing and the provision of a reliable and practical extension actuating means limit the number of sections which can be used in an antenna having telescoping sections.

The present invention provides an extensible dipole antenna which, by telescope elements with an articulated element, can be stored in a housing whose length is approximately one-quarter of the extended length of the antenna and in which the extension actuating means may be power operated.

A further object of the present invention is to provide a telescoping antenna in which the telescoping members and an elongated member, or rod, are stored in side-by-side relation within a housing, the rod and one of the telescoping members being joined at their adjacent ends by a stressed resilient member to provide an articulated joint between the rod and the telescoping member.

A further object of the present invention is to provide an antenna of the type referred to above in which the member forming the articulated joint btween two of the antenna sections snaps the sections into end-opposed, linear relation as they are freed of the housing.

A further object of the present invention is to provide an antenna of the type referred to above in which one of the antenna sections carries a sleeve which, as the antenna is extended, is positioned so as to make rigid the articulated joint between the antenna sections.

A further object of the present invention is to provide an extensible antenna of the type referred to above in which the antenna lead cable extends centrally through the telescoping antenna sections.

A further object of the present invention is to provide an extensible antenna of the type referred to above which is actuated to extended position by means of a draw-cord accessible from the exterior of the antenna housing, and particularly lending itself for use with remotely actuated power operating means.

These and other objects will become apparent as the description proceeds with reference to the accompanying drawings, in which:

Fig. 1 represents a side, sectional view of an antenna embodying the present invention, the antenna being shown in extended position;

Fig. 2 represents a top plan view of the antenna in stored position;

Fig. 3 is a sectional view taken generally along the line 3—3 of Fig. 2; and

Fig. 4 is a sectional view of the antenna taken generally along the line 4—4 of Fig. 2.

Referring initially to Figs. 2, 3 and 4, there is shown at 10 an elongated tubular housing having a closure member 11 at its outer end. At the end opposite the closure member, the housing carries an internal annular shoulder 12 which acts as a stop for a header member 13 slidably received within the housing. An outer tube 14, formed of suitable electrical insulating material, is carried by the header and extends beyond the housing through an appropriately sized opening in the closure member 11. It will be formed integrally, the operational requirement being that the tube 14 be formed of electrical insulating material.

Adjacent to its inner end, the tube 14 is provided with an annular internal shoulder 16 which serves to seat the enlarged or flanged end 17 of an inner tube 18 nested, or telescoped, within the outer tube. The tube 18 extends slidably through an approximately sized opening in the closed outer end 19 of the tube 14. A coupling member 21, having reduced end sections, and formed of suitable electrical insulating material, extends for a portion of its length within the outer end of the tube 18 and is rigidly secured thereto. The other reduced end of the coupling member accommodates and secures the convolutions of the tightly wound tension spring 22 which, as may be seen in Fig. 3, is stressed into a U-shape and received upon the reduced end of a second coupling member 23. The coupling member 23 is similar in configuration to the member 21, but is formed, however, of electrically conductive material. The opposite reduced end of the member 23 is received within the central bore of a rod 24 and rigidly secured therein. The rod extends through the housing and is slidably received at its tip, within an opening 26 in the header member 13. A sleeve 27, formed of suitable insulating material, surrounds the upper section of the rod 24 and slidably extends through an appropriately sized opening in the housing closure member 11. A transverse pin 28, extending through the rod 24, serves to seat a compression spring 29 which extends between the pin and a shoulder formed by an internal flange 31 on the sleeve 27. As shown in Fig. 3, with the antenna in stored position, the sleeve will thus be urged outwardly on the rod, its position being established by engagement with the coils of the tension spring 22.

From the foregoing it will be evident that the telescoped tubes 14 and 18 are accommodated within the housing in side-by-side relation to the rod 24, with a stressed resilient member, formed by the spring 22, providing an articulated joint between the rod and the tube 18.

The means for actuating the antenna to extended position comprises a flexible draw-cord 32 which is suitably anchored at 33 to the inner end of the tube 18. The cord is brought out through an appropriate opening 34 in the closed end 19 of the outer tube and re-enters the housing through an opening 36 in the housing closure member 11. The cord is further threaded or looped through spaced openings 37 in the header member and returns to the exterior of the housing through an opening 38 in the closure member 11. The cord may be wound or reeled by any suitable means, such as a motor-driven spool shown schematically at 39 (Fig. 1).

The antenna lead cable 41 enters the housing through an opening 42 in the closure member, extends through an opening in the member 13, and is accommodated within the central bore of the tube 18. As may best be seen in Fig. 3, the coupling member 21 has a central opening therethrough accommodating the antenna lead cable which further extends through the spring 22 and is electrically connected, by soldering or other suitable means, to the coupling member 23. It will be understood that the lead cable is conventionally formed of insulated coaxial conductors, with the inner conductor being connected to coupling member 23 and the outer conductor being connected as at 43 (Fig. 1) to the tube 18. The tube 18 and the rod 24 thus form the two insulated sections of the dipole antenna structure.

In operation, with the antenna sections in stored position as shown in Fig. 4, upon clockwise rotation of the spool, the cord 32 will initially draw the header member 13 and tube 18 through the housing, thereby extending or unsheathing the nested tubes from the housing. This movement of the member 13 will continue until it engages the inner face of the housing closure member 11, and during such movement the rod 24 will also be withdrawn from the housing, its tip, however, remaining within the housing holding the rod in folded position. Further rotation of the spool 39 will thereafter extend, or unsheath, the tube 18 from the tube 14. During the initial portion of this movement the rod 24 will be freed completely from the housing and the tension spring will thereupon snap the rod into upright position above the tube 18, indicated in Fig. 1. As the rod and tube assume a linear relation, the sleeve 27 will be moved by the spring 29 into a position spanning the gap between the opposed ends of the rod and tube and enclosing the spring 22, its position being established by engagement of the flange 31 with the central enlarged portion of the coupling member 23. As will be evident from Fig. 1, the straightening of the spring 22 and the subsequent enclosure thereof by the sleeve 27 serves to make rigid, or lock, the joint between the rod and the tube as the rod is freed from the housing.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The features and advantages herein referred to may be retained in modified forms of the present invention. The scope of the invention is therefore to be limited only by the appended claims.

The invention claimed is:

1. A telescoping dipole antenna adapted to be actuated to extended position comprising an elongated storage housing accommodating in nested relation an outer first tube and an inner second tube, cooperating stop means carried by the outer end of the first tube and the inner end of the second tube to prevent complete withdrawal of the second tube from said first tube, a header member carried by the inner end of the first tube cooperating with the housing to prevent complete withdrawal of the first tube therefrom, an elongated member accommodated within said housing in side-by-side relation to said tubes, connecting means comprising a stressed resilient member joining the adjacent ends of said second tube and said elongated member adapted to snap the tube and member into end-opposed relation upon freeing of the elongated member from said housing, a locking sleeve carried by said elongated member adjacent said connecting means, a spring extending between said sleeve and said elongated member for urging the sleeve into a position spanning said connecting means when said tube and said member assume end-opposed relation, means for extending the antenna comprising a flexible cable attached to the inner end of said second tube and extending therethrough to provide a re-entrant cable section within said housing having a looped attachment to said header, and means for winding said cable to thereby initially withdraw the nested tubes from said housing, thereafter withdrawing the second tube from said first tube and freeing said elongated member from said housing.

2. A telescoping dipole antenna adapted to be actuated to extended position comprising an elongated storage housing accommodating in nested relation an outer first tube and an inner second tube, a rod accommodated within said housing in side-by-side relation to said tubes, connecting means comprising a stressed resilient member joining the adjacent ends of said second tube and said rod adapted to snap the tube and rod into end-opposed relation upon freeing of the rod from said housing, a locking sleeve carried by said rod adjacent said connecting means, a spring extending between said sleeve and said rod for urging the sleeve into a position spanning said connecting means when said tube and said rod assume end-opposed relation, means for extending the antenna comprising a flexible cable attached to the inner end of said second tube and extending therethrough to provide a re-entrant cable section within said housing having a looped attachment to the inner end of said first tube, and power means for winding said cable to thereby initially withdraw the nested tubes from said housing, thereafter withdrawing the second tube from said first tube and freeing said elongated member from said housing.

3. A telescoping dipole antenna adapted to be actuated to extended position comprising an elongated storage housing accommodating in nested relation an outer first tube and an inner second tube, an elongated member accommodated within said housing in side-by-side relation to said tubes, connecting means comprising a stressed resilient member joining the adjacent ends of said second tube and said elongated member adapted to snap the tube and member into end-opposed relation upon freeing of the elongated member from said housing, a locking sleeve carried by said elongated member adjacent said connecting means, and biasing means urging the sleeve into a position spanning said connecting means when said tube and said member assume end-opposed relation.

4. A telescoping dipole antenna adapted to be actuated to extended position comprising an elongated storage housing accommodating in nested relation an outer first tube and an inner second tube, an elongated member accommadated within said housing in side-by-side relation to said tubes, connecting means comprising a stressed resilient member joining the adjacent ends of said second tube and said elongated member adapted to snap the tube and member into end-opposed relation upon freeing of the elongated member from said housing, a locking element carried by said elongated member adjacent said connecting means, and biasing means urging the sleeve into locking relation with said connecting means when said tube and said member assume end-opposed relation.

5. A telescoping dipole antenna comprising an elongated housing accommodating in extensible nested relation an outer tube formed of insulating material and an inner tube formed of conductive material, a conductive rod accommodated within said housing in side-by-side relation to said tubes and generally coextensive therewith, an electrically insulating articulated joint between the outer adjacent ends of said inner tube and said rod including a stressed resilient member extending between said adjacent ends and adapted to snap the tube and rod into end-opposed relation upon freeing of the rod from said housing, a sleeve formed of insulating material and carried by said rod, biasing means urging said sleeve into enclosing relation with said resilient member when said tube and said member assume end-opposed relation, antenna extending means comprising a draw-cord having connection with the inner ends of said tubes whereby drawing said cord initially extends said tubes and rod from said housing and subsequently extends the inner tube from the outer tube freeing the rod from the housing, and an antenna lead cable extending through said inner tube having insulated conductors electrically connected to said inner tube and said rod.

6. A telescoping dipole antenna comprising an elongated housing accommodating in extensible nested relation an outer tube formed of insulating material and an inner tube formed of conductive material, a conductive rod accommodated within said housing in side-by-side relation to said tubes and generally coextensive therewith, an electrically insulating articulated joint between the outer adjacent ends of said inner tube and said rod including a stressed resilient member extending between said adjacent ends and adapted to snap the tube and rod into end-opposing relation upon freeing of the rod from said housing, a locking element formed of insulating material and carried by said rod, biasing means urging said element into locking relation with said resilient member when said tube and said member assume end-opposed relation, antenna extending means adapted to extend said tubes and rod from said housing and subsequently extend the inner tube from the outer tube freeing the rod from the housing, and an antenna lead cable extending through said inner tube having insulated conductors electrically connected to said inner tube and said rod.

7. A telescoping dipole antenna comprising an elongated housing accommodating in extensible nested relation an outer tube formed of insulating material and an inner tube formed of conductive material, a conductive rod accommodated within said housing in side-by-side relation to said tubes and generally coextensive therewith, an electrically insulating articulated joint between the outer adjacent ends of said inner tube and said rod including a stressed resilient member extending between said adjacent ends and adapted to snap the tube and rod into end-opposed relation upon freeing of the rod from said housing, a sleeve formed of insulating material and carried by said rod, biasing means urging said sleeve into enclosing relation with said resilient member when said tube and said member assume end-opposed relation, and power operated means for withdrawing said tubes and freeing said rod from the housing.

8. A multi-section dipole antenna extensible from a housing, said antenna including two nested tubes and a rod accommodated side-by-side within the housing, an articulated joint between the adjacent ends of the inner one of said tubes and said rod, said joint being biased to position said rod and said inner tube in end-opposed relation upon freeing of the rod from said housing, and means accessible exteriorly of said housing for sequentially extending said tubes and said rod from one end of the housing and then extending said tubes relative to each other and freeing said rod from the housing.

9. A multi-section dipole antenna extensible from a housing, said antenna including two nested tubes and a rod accommodated side-by-side within the housing, an articulated joint between the adjacent ends of the inner one of said tubes and said rod, said joint being biased to position said rod and said inner tube in end-opposed relation upon freeing of the rod from said housing, a locking element operable to lock said joint upon assumption of said end-opposed relation, and means accessible exteriorly of said housing for sequentially extending said tubes and said rod from one end of the housing and then extending said tubes relative to each other and freeing said rod from the housing.

10. A multi-section dipole antenna extensible from a housing, said antenna including two nested tubes and a rod accommodated side-by-side within the housing, an articulated joint between the adjacent ends of the inner one of said tubes and said rod, said joint being biased to position said rod and said inner tube in end-opposed relation upon freeing of the rod from said housing, and a locking element operable to lock said joint upon assumption of said end-opposed relation.

11. A multi-section dipole antenna extensible from a housing, said antenna including two nested tubes and a rod accommodated side-by-side within the housing, an articulated joint between the adjacent ends of the inner one of said tubes and said rod, said joint being biased to position said rod and said inner tube in end-opposed relation upon freeing of the rod from said housing, and means for extending said tubes and freeing said rod from said housing.

*12. In a multi-section antenna structure, a housing, an extensible supporting member slidably supported within said housing, an antenna element accommodated within the housing, an articulated joint between the adjacent ends of the supporting member and said antenna element, said joint comprising means for biasing and aligning said element and said supporting member in end-opposed relation upon freeing of the antenna element from the housing, and a locking element operable to lock said joint upon assumption of said end-opposed relation.*

*13. In a multi-section antenna structure, a housing, an extensible supporting member slidably supported within said housing, an antenna element accommodated within the housing, an articulated joint between the adjacent ends of said supporting member and said antenna element, said joint comprising means for biasing and aligning said element and said supporting member in end-opposed relation upon freeing of the antenna element from said housing, and means for extending said supporting member and freeing said element from said housing.*

*14. An antenna adapted to be actuated from a collapsed position to an extended position comprising a storage housing, a supporting member movably supported within said housing, a first antenna member disposed within said housing adjacent to said supporting member and structurally associated therewith for movement into an extended position with respect thereto, a second antenna member disposed within said housing and including a means connecting it with said first antenna member for moving said second antenna member out of said housing with said first antenna member and aligning and erecting said second antenna member to form an extension of said first antenna member, and means operable for extending the antenna comprising a flexible cable interconnecting said supporting member and said antenna members.*

*15. An antenna adapted to be actuated from a collapsed position to an extended position comprising a storage housing, a supporting member movably supported within said housing, an antenna member disposed within said housing adjacent to said supporting member and structurally associated therewith for movement into an extended position with respect thereto, said antenna member including a means connecting it with said supporting member for moving said antenna member out of said housing with said supporting member and aligning and erecting said antenna member to form an extension of said supporting member, and means operable for extending the antenna comprising a flexible cable interconnecting said supporting member and said antenna member.*

*16. An antenna adapted to be actuated from a collapsed position to an extended position comprising a storage housing, a plurality of antenna elements disposed within said housing in collapsed relation to one another, self-operable means connecting said antenna elements for erecting said antenna elements in end-to-end relation, and means interconnecting said antenna elements for moving said antenna elements out of said housing.*

*17. Antenna structure comprising a supporting member, an antenna normally disposed adjacent to said supporting member, means for holding said member and said antenna in said adjacent relation, self-operable means*

*connected between the adjacent ends of said supporting member and said antenna for erecting said antenna element as an extension of said supporting member, and means operable for freeing said antenna element for erection with respect to said supporting member.*

*18. Antenna structure comprising a multi-element antenna having its elements normally disposed adjacent one another, means for holding said elements in said adjacent relation, means connected between the adjacent ends of said antenna elements and self-operable for erecting said antenna elements in end-to-end relationship, and means*

*operable for freeing said antenna elements from said holding means for erection.*

References Cited in the file of this patent or the original patent

UNITED STATES PATENTS

| | | |
|---|---|---|
| 2,094,475 | Schwarzhaupt | Sept. 28, 1937 |
| 2,379,577 | Harsted | July 3, 1945 |
| 2,391,202 | Tellander et al. | Dec. 18, 1945 |
| 2,419,611 | Walsh | Apr. 29, 1947 |